(12) United States Patent
Pal

(10) Patent No.: US 11,392,630 B2
(45) Date of Patent: Jul. 19, 2022

(54) PRESENTING A SUMMARY OF COMPONENTS IN A FILE

(71) Applicant: Microsoft Technology Licensing, LLC, Redmond, WA (US)

(72) Inventor: Manji Singh Pal, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 126 days.

(21) Appl. No.: 15/947,560

(22) Filed: Apr. 6, 2018

(65) Prior Publication Data
US 2019/0311066 A1  Oct. 10, 2019

(51) Int. Cl.
| | |
|---|---|
| *G06F 16/34* | (2019.01) |
| *G06F 3/0482* | (2013.01) |
| *G06F 16/17* | (2019.01) |
| *G06F 16/9038* | (2019.01) |
| *G06Q 10/10* | (2012.01) |
| *G06F 16/9536* | (2019.01) |
| *G06F 11/34* | (2006.01) |

(52) U.S. Cl.
CPC .......... *G06F 16/345* (2019.01); *G06F 3/0482* (2013.01); *G06F 11/3438* (2013.01); *G06F 16/1734* (2019.01); *G06F 16/9038* (2019.01); *G06F 16/9536* (2019.01); *G06Q 10/10* (2013.01)

(58) Field of Classification Search
CPC ... G11B 27/3081; G06F 21/10; G06F 16/178; G06F 16/345; H04N 5/76; G06T 3/0012
See application file for complete search history.

(56) References Cited

U.S. PATENT DOCUMENTS

| | | | | |
|---|---|---|---|---|
| 5,708,825 A | * | 1/1998 | Sotomayor | G06F 40/134 715/205 |
| 6,128,622 A | * | 10/2000 | Bach | G06F 16/289 717/114 |
| 8,769,589 B2 | | 7/2014 | Amento et al. | |
| 9,507,795 B2 | * | 11/2016 | Dorman | G06F 16/178 |
| 2002/0184312 A1 | * | 12/2002 | Chen | G06F 16/40 709/205 |
| 2002/0196274 A1 | * | 12/2002 | Comfort | G06F 21/31 715/741 |
| 2003/0235391 A1 | * | 12/2003 | Gates | H04N 5/76 386/295 |

(Continued)

OTHER PUBLICATIONS

"Automatically Summarize a Document", Retrieved from: <<https://support.office.com/en-us/article/automatically-summarize-a-document-b43f20ae-ec4b-41cc-b40a-753eed6d7424>>, Retrieved on: Feb. 19, 2018, 4 Pages.

(Continued)

*Primary Examiner* — Etienne P Leroux

(57) ABSTRACT

Systems, methods, and software are disclosed herein to provide users with a summary of components in a file. A record is maintained of actions taken by users on a plurality of components in a file. The record is evaluated to identify one or more components of the plurality of components based on the actions taken by the users on the plurality of components in the file. In response to identifying the one or more components in the file, a summary of the plurality of components in the file is presented in a user interface comprising the one or more identified components of the plurality of components.

18 Claims, 7 Drawing Sheets

(56) References Cited

U.S. PATENT DOCUMENTS

| | | | | |
|---|---|---|---|---|
| 2005/0262243 | A1* | 11/2005 | Ternasky | G06F 21/10 |
| | | | | 709/225 |
| 2006/0206361 | A1* | 9/2006 | Logan, Jr. | G16H 10/60 |
| | | | | 705/3 |
| 2008/0010087 | A1* | 1/2008 | Daniel | G06Q 10/10 |
| | | | | 705/2 |
| 2008/0077860 | A1* | 3/2008 | Godoy | G06F 40/10 |
| | | | | 715/273 |
| 2009/0204603 | A1* | 8/2009 | Martino | G06Q 50/10 |
| 2009/0259722 | A1* | 10/2009 | Sundaram | G06Q 10/107 |
| | | | | 709/206 |
| 2009/0313544 | A1 | 12/2009 | Wood et al. | |
| 2010/0114985 | A1 | 5/2010 | Chaudhary et al. | |
| 2011/0009707 | A1* | 1/2011 | Kaundinya | G16H 40/67 |
| | | | | 600/300 |
| 2011/0029683 | A1* | 2/2011 | Bell | H04L 29/12132 |
| | | | | 709/230 |
| 2013/0097490 | A1 | 4/2013 | Kotler et al. | |
| 2013/0103692 | A1* | 4/2013 | Raza | G06Q 30/02 |
| | | | | 707/741 |
| 2013/0311905 | A1* | 11/2013 | Czyzewicz | H04L 67/02 |
| | | | | 715/753 |
| 2015/0095855 | A1 | 4/2015 | Bai et al. | |
| 2015/0186346 | A1* | 7/2015 | Mesguich Havilio | G06F 3/0488 |
| | | | | 715/256 |
| 2015/0206446 | A1 | 7/2015 | Gupta et al. | |
| 2015/0235672 | A1* | 8/2015 | Cudak | H04N 21/8153 |
| | | | | 386/241 |
| 2017/0083211 | A1 | 3/2017 | Ramkumar et al. | |
| 2017/0103365 | A1* | 4/2017 | Fisher | G06Q 10/103 |
| 2017/0116179 | A1* | 4/2017 | Gagne-Langevin | G06F 40/226 |
| 2017/0249719 | A1* | 8/2017 | Kansara | G06K 9/00228 |
| 2018/0089160 | A1* | 3/2018 | Bastide | G06F 40/18 |
| 2019/0272335 | A1* | 9/2019 | Liu | G06F 16/21 |

OTHER PUBLICATIONS

"Yesware blog", Retrieved from: <<https://www.yesware.com/blog/help/how-to/using-presentation-tracking-feature/>>, Retrieved on: Feb. 19, 2018, 2 Pages.

"International Search Report and Written Opinion Issued in PCT Application No. PCT/US2019/024173", dated Jul. 5, 2019, 11 Pages.

* cited by examiner

FIGURE 3

| | File (341) | Component (342) | Action (343) | User(s) (344) | User Type(s) (345) | Summary Group |
|---|---|---|---|---|---|---|
| | Presentation | Slide 1 | Long View | 97% of Users | All Depts | All Dept. Summary |
| | Presentation | Slide 11 | Highlight | 78% of Users | All Depts | All Dept. Summary |
| | Presentation | Slide 22 | Addition | CEO | Executive | All Dept. Summary |
| | Presentation | Slide 10 | Laser Point | Manager | R&D | R&D Dept. Summary |
| | Presentation | Slide 12 | Highlight | 70% of Users | R&D | R&D Dept. Summary |
| | Presentation | Slide 23 | Screenshot | Manager | Marketing | Marketing Dept. Summary |
| | Presentation | Slide 24 | Screen Share | Controller | Accounting | Marketing Dept. Summary |
| | Presentation | Slide 2 | Edit | 1 User | Legal | Not In Summary |
| | Presentation | Slides 2-9 & 13-20 | None | None | None | Not In Summary |

PRESENTING A SUMMARY OF COMPONENTS IN A FILE

TECHNICAL FIELD

Aspects of the disclosure are related to computing hardware and software technology, and in particular to present a summary of components in a file.

TECHNICAL BACKGROUND

Many software applications provide users with the capability to distribute a file amongst a large number of users. These software applications include various components (e.g., presentation slides, portions of text, spreadsheet tabs, audio clips, video clips, etc.) compiled into the file (e.g., presentation slide deck, text document, spreadsheet book, audio file, video file, etc.) which may be shared and viewed by any of the users accessing the file within the software application, such as in a cloud computing environment. These files may include any number of components and may become very large. While some of the components in the file may be of interest to some users, other components may not. Unfortunately, current software applications do not enable users to only view components of interest without first providing the user with all of the components distributed amongst the users in the file. This limits an ability of the application to enhance a user experience when viewing the components in a file which has a large number of components.

OVERVIEW

An enhanced system, method, and software application are disclosed herein to improve providing users with a summary of components in a file. A record is maintained of actions taken by users on a plurality of components in a file. The record is evaluated to identify one or more identified components of the plurality of components based on the actions taken by the users on the plurality of components in the file. In response to identifying the one or more components in the file, a summary of the plurality of components in the file is presented in a user interface comprising the one or more identified components of the plurality of components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates an exemplary data table in an implementation of an enhanced application to provide users with a summary of components in a file.

TECHNICAL DESCRIPTION

Figure 1:
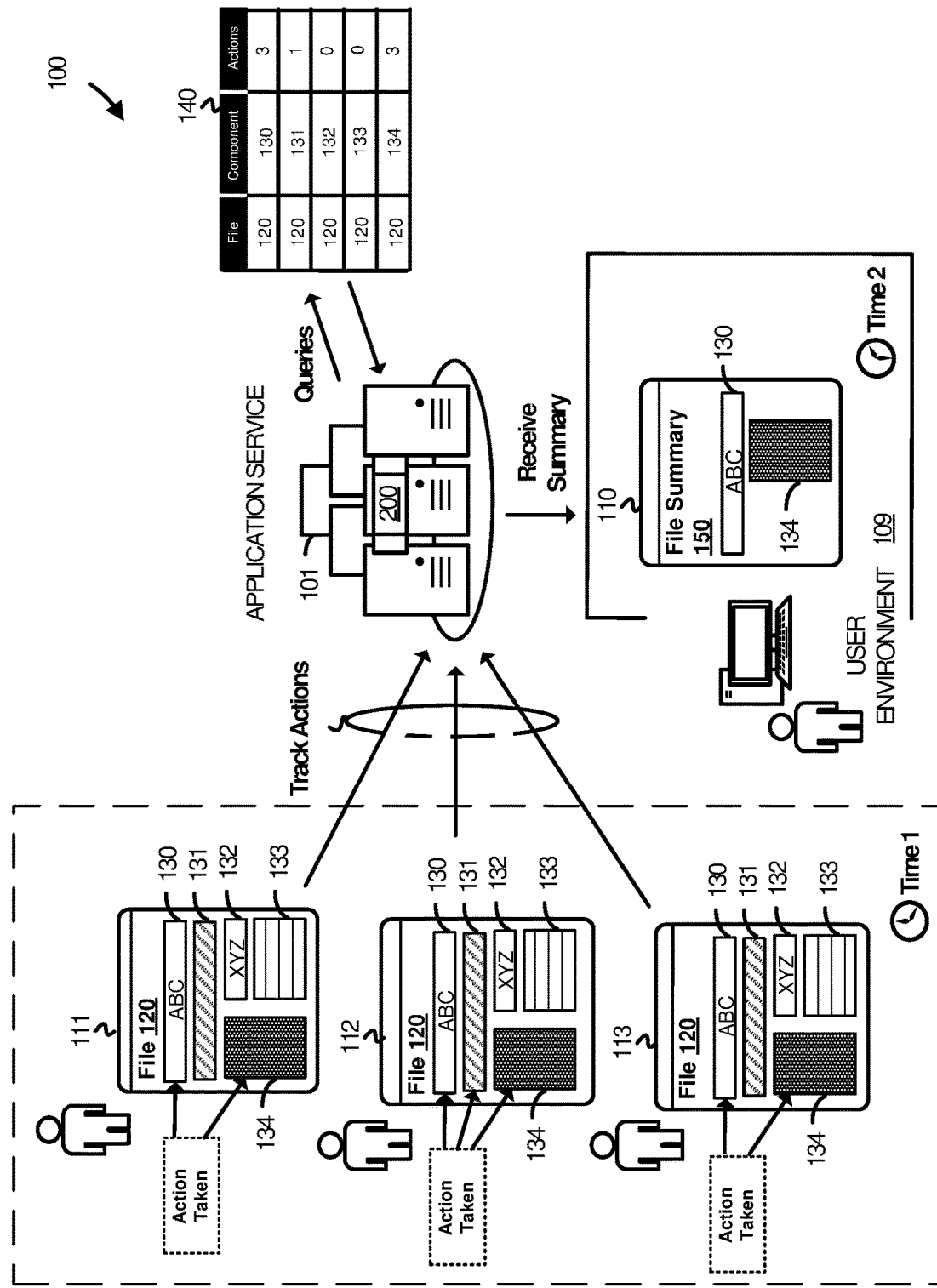
FIG. 1 illustrates an operational architecture for implementing an enhanced application to provide users with a summary of components in a file.

Examples of the present disclosure describe an application for providing users with a summary of components in a file. A record is maintained of actions taken by users on a plurality of components in a file. The record is evaluated to identify one or more components of the plurality of components based on the actions taken by the users on the plurality of components in the file. In response to identifying the one or more components in the file, a summary of the plurality of components in the file is presented in a user interface comprising the one or more identified components of the plurality of components.

A technical effect that may be appreciated from the present discussion is the increased efficiency in identifying components that may be relevant to a given user based on previous interactions with the components by other users (e.g., other users viewed certain slides in a presentation more than others indicating that the slides may be of greater significance) and providing a summary of only those slides of interest to the user. The application described herein also improves efficiency by only displaying the most important components to a user which saves the user time searching through the components of the file and ensure that the user does not overlook components that have been deemed important by other users who have viewed the components of the file.

Further, examples herein describe that the actions taken by the users on the plurality of components in the file comprise at least one of a screen view for a timed duration, a hover, a tap, a touch, a click, or a screenshot of the plurality of components in the file. In other examples, the actions taken by the users on the plurality of components in the file may also comprise at least one of an addition, an edit, an insertion, a copy and paste, a duplication, a rearrangement, or a typographical variation of the plurality of components in the file. The actions taken by the users on the plurality of components in the file may further comprise a rewind, a fast-forward, a replay, a pause, or a slow-motion.

In some implementations, the record of actions taken by the user further comprises a user identity, a user group, a location, or a subject matter associated with each the actions. In this implementation, the record is evaluated to identify the one or more components based on the indicated user identity, user group, location, or subject matter associated with each of the actions taken on the plurality of components in the file. In some examples, the record is evaluated to identify the one or more components based on a weighted average of the indicated user identity, user group, location, or subject matter associated with each of the actions taken on the plurality of components in the file. In other scenarios, the record further comprises actions taken by users on portions of the plurality of components in the file. In this example, the summary further comprises the one or more identified portions of the plurality of components in the file.

In yet another example, the summary of the plurality of components in the file includes presenting an option to view at additional components in the file associated with each of the one or more identified components in the file. The components in the file may comprise at least a presentation slide, a portion of text, a spreadsheet tab, a data entity card, a photo, a table, a reference, a graph, an audio clip, or a video clip. The file may comprise at least a deck of presentation slides, a text document, a spreadsheet book, an audio file, or a video file.

Referring to the drawings, FIG. 1 illustrates an exemplary operational architecture 100 related to processing operations for management of an exemplary enhanced system with which aspects of the present disclosure may be practiced. Operational environment 100 includes application service 101. Application service 101 employs a summarizing process 200 in the context of producing views in a user interface 110 in a computing environment. User interface 110 displays components in a shared file to users produced by application service 101.

Figure 7:
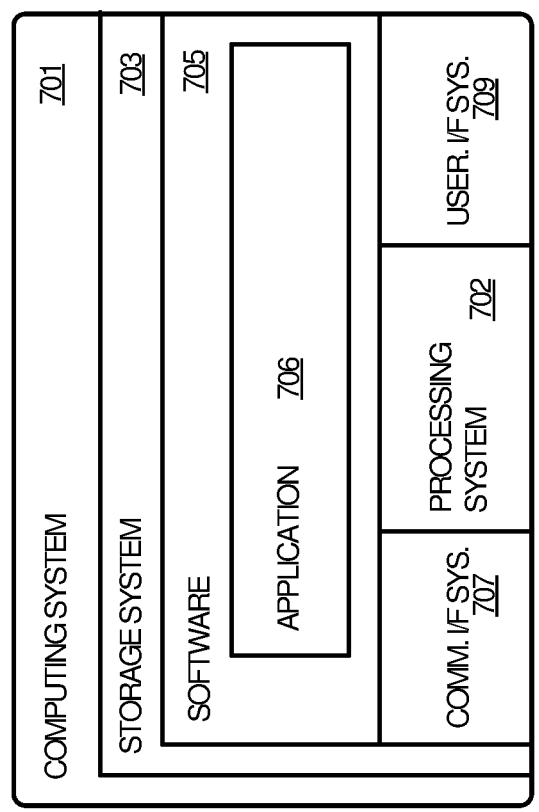
FIG. 7 illustrates a computing system suitable for implementing the technology disclosed herein, including any of the architectures, processes, operational scenarios, and operational sequences illustrated in the Figures and discussed below in the Technical Description.

Application service 101 is representative of any device capable of running an application natively or in the context of a web browser, streaming an application, or executing an application in any other manner. Examples of application service 101 include, but are not limited to, personal computers, mobile phones, tablet computers, desktop computers, laptop computers, wearable computing devices, or any other form factor, including any combination of computers or variations thereof. Application service 101 may include various hardware and software elements in a supporting architecture suitable for performing summarizing process 200. One such representative architecture is illustrated in FIG. 7 with respect to computing system 701.

Application service 101 also includes a software application or application component capable of selectively indicating an action to components in a shared file in accordance with the processes described herein. Examples of the software application include, but are not limited to, presentation applications, diagraming applications, computer-aided design applications, productivity applications (e.g. word processors or spreadsheet applications), audio and video applications, and any other type of combination or variation thereof. The software application may be implemented as a natively installed and executed application, a web application hosted in the context of a browser, a streamed or streaming application, a mobile application, or any variation or combination thereof.

User interfaces 110-113 includes a representative view that may be produced by a file sharing application which may be opened and viewed by multiple users, such as Word® emailed to multiple users or shared on SharePoint® from Microsoft®, although the dynamics illustrated in FIG. 1 with respect to user interface 110 may apply to any other suitable application. User interfaces 110-113 may display components, such as presentation slides, portions of text, tabs in a spreadsheet book, photos, tables, graphs, references, audio clips, or video clips, for example. An end user may interface with application service 101 to view/hover on components, screenshot/screen share components, add/edit components, copy and paste components, insert components, point a laser at or write on the component using a user interface tool, or any other type of component action in shared file 120 presented in user interfaces 111-113. The actions taken by the users on the plurality of components 130-134 in file 120 may further comprise a rewind, a fast-forward, a replay, a pause, or a slow-motion. It should be noted that the user interactions with components 130-134 of shared file 120 are tracked and maintained a record (i.e., record 140).

The user may interface with application service 101 over user interfaces 110-113 using an input instrument such as a stylus, mouse device, keyboard, touch gesture, as well as any other suitable input device. The user may initiate a command to introduce components 130-134 into shared file 120, such as typing, copying and pasting, inserting, dragging and dropping, importing/exporting, etc. The user may also interact with components 130-134 of shared file 120 by viewing the component for a duration on time, hovering, tapping, touching, clicking, screenshotting, screen sharing, zooming, lasering pointing, or writing on the components using a digital inking pen.

Figure 2:
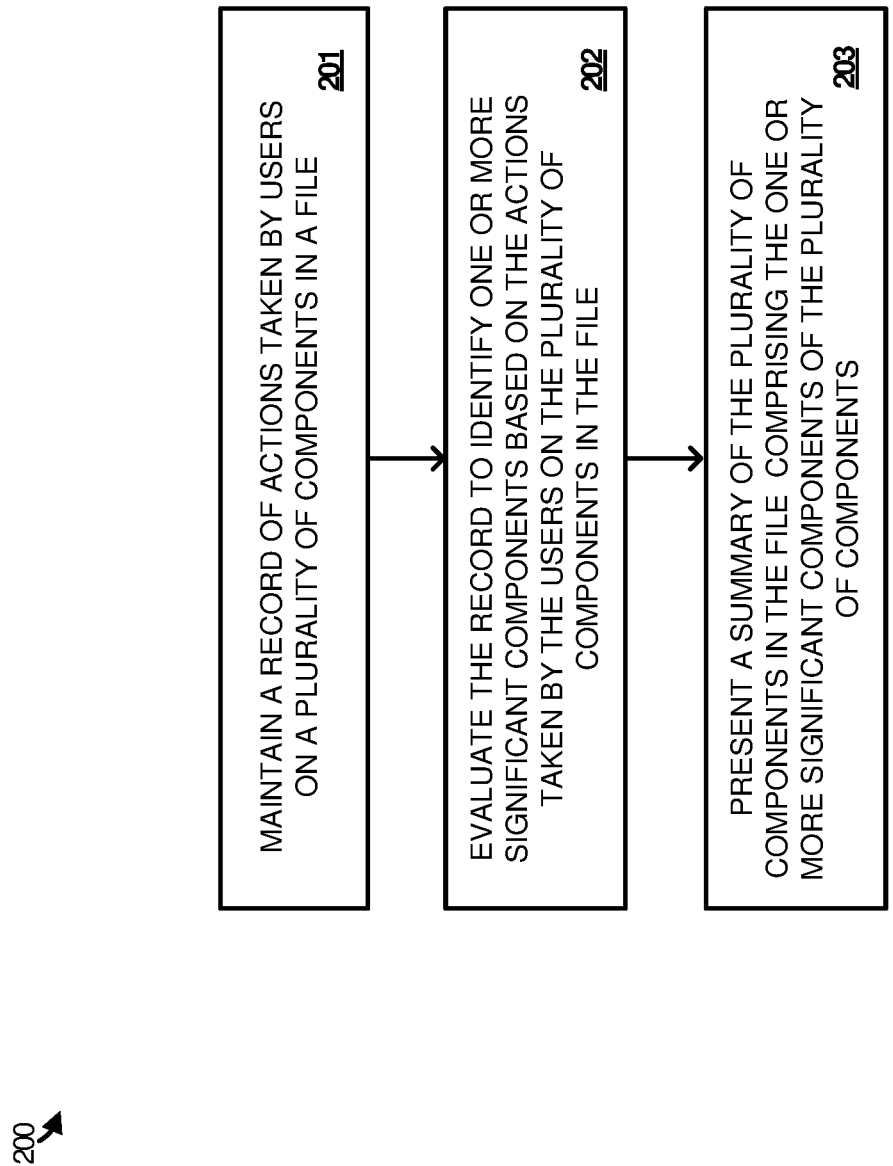
FIG. 2 illustrates a summarizing process employed in implementations of an enhanced application to provide users with a summary of components in a file.

More particularly, FIG. 2 illustrates summarizing process 200 which, as mentioned, may be employed by application service 101 to provide a summary of components in a file as described herein. Some or all of the steps of summarizing process 200 may be implemented in program instructions in the context of a component or components of the application used to carry out the summarization feature. The program instructions direct application service 101 to operate as follows, referring parenthetically to the steps in FIG. 2 in the context of FIG. 1.

In operation, application service 101 maintains a record of actions taken by users on user interfaces 111-113 on a plurality of components 130-134 in file 120. File 120 may be a presentation, canvas or diagram, productivity document (e.g. word document or spreadsheet), audio file, video file, and any other type of combination or variation thereof. File 120 may be generated in application service 101 by a user or a plurality of users and distributed amongst a variety of users. For instance, a user may create file 120 by uploading a template or generating a presentation which is to be distributed amongst all users in the company. Some exemplary applications are further configured to enable users to pull previously generated files locally (e.g. from a storage of a specific computing device) or retrieve files via a network connection (e.g. retrieve from a distributed storage, website, etc.). A user may then share file 120 with other users to view using application service 101.

Although not illustrated in FIG. 1, it should be noted that the actions of the users may be maintained in record 140 (in whole or in part) using a native application, a web browser, a streaming application, a cloud application, or any other application in any other manner. Different records may be used to track actions taken to components 130-134 between users in the software applications. Record databases (i.e., record 140) may be found in a variety of applications, including text-based applications, spreadsheet applications, presentation applications, mobile applications, web applications, database applications, audio/video editing and replay applications, and graphic design applications, and may be especially useful in the context of document sharing and viewing. Application service 101 may insert various components into file 120. Some exemplary applications are further configured to enable users to pull components locally (e.g. from a storage of a specific computing device) or retrieve components via a network connection (e.g. retrieve components from a distributed storage, website, etc.).

Application service 101 may receive user input indicative of the command to perform an action on components 130-134 by receiving user input in user interfaces 111-113. Application service 101 may then store the action taken to the component in record 140 in the software application based on the received user input. Application service 101 may receive the user input using an input instrument such as a stylus, mouse device, keyboard, touch gesture, as well as any other suitable input device. Components 130-134 may be a presentation slide, a portion of text, a tab in a spreadsheet book, a data entity card, an image, a table, a graph, a data range, a reference, an audio clip, a video clip, and the like. For example, component 130 may be introduced into collaborative document 120 by typing a portion of text, such as "ABC", into file 120.

The users of user interfaces 111-113 may then interact with each of components 130-134 using various actions which are tracked and stored by application service 101. For example, user interfaces 111-113 may determine an extended view time on component 130 and component 134. Additionally, user interface 112 may also receive an action on component 131, such as a touch, a zoom, a screenshot, etc. However, neither component 132 nor component 133 had any actions taken by the users of user interfaces 111-113 indicating that these components may not be significant in file 120. Although component 131 had an action taken via user interface 112, it may also not be determined to be significant since only one user showed interest in the component. On the other hand, component 130 and component 134 may be determined to be significant since all (or at least a majority) of the users of user interfaces 111-113 performed an action on each of the components. Application service 101 may record these action in record 140 along with an identity of users of user interfaces 111-113. In some implementations, the actions taken by the users on the plurality of components in the file comprise at least one of a screen view for a timed duration, a hover, a tap, a touch, a click, or a screenshot of the plurality of components 130-134 in file 120. Other actions that may be taken by users include an edit, a copy, a typographical variation, a rewind, a fast-forward to, a replay, or a slow-motion of the plurality of components 130-134 in file 120.

In a next operation, application service 101 then evaluates record 140 to identify one or more components 130 and 134 of the plurality of components 130-134 based on the actions taken by the users of user interfaces 111-113 on the plurality of components in file 120 (step 202). Application service 101 may query record 140 for any actions taken to components 130-134 by periodically identifying the actions taken on components 130-134 of file 120 in a latest time period. Application service 101 also query record 140 when user 109 interacts with file 120, such as when file 120 is saved, re-opened, shared, emailed, re-located in a storage system, etc. Record 140 may also be queried for actions taken by other users to components 130 and 134 when instructed by user 109, such as by prompting a summary option to user 109. It should also be noted that in some implementations, record 140 also tracks and maintains actions taken to portions of components 130-134. For example, in addition to tracking actions taken by users on a presentation slide, record 140 may track a specific portion of the presentation slide with which the users were taking actions on.

In some implementations, the record of actions taken by the user further comprises a user identity, a user group, a location, or a subject matter associated with each the actions.

In this implementation, record 140 is evaluated to identify the one or more components based on the indicated user identity, user group, location, or subject matter associated with the actions taken by the users on the plurality of components 130-134 in file 120. For example, a user may indicate a user preference profile that actions made by the user of user interface 111, users associated with a name group, or actions on components of a specified topic are of interest to user 109. In some examples, record 140 is evaluated to identify the one or more components based on a weighted average of the indicated user identity, user group, location, or subject matter associated with the actions taken by the users on the plurality of components 130-134 in file 120.

Application service 101 may also allocate the component as live or static. If the component is allocated as live, the component may be tracked for actions in file 120 for actions taken by other users. If the component is allocated as static, the component will not be tracked in file 120 for actions taken by other users. For example, a table of contents in a document may be allocated as static in that many users may view the table of contents but the table of contents is not necessary to be included in the summary of highlighted components. It should be noted that application service 101 may also allocate the component as live for certain actions taken by users, but as static for other actions made by other users. For example, actions made by a manager in a department may be allocated as active actions taken on the component. However, actions taken by an employee in another department may be allocated as static and therefore, would not be considered when evaluating record 140 to determine the components 130-134.

In a final operation, application service 101 presents summary 150 of the plurality of components 130-134 in file 120 in user interface 110 comprising the one or more identified components of the plurality of components (step 203). Summary 150 of the plurality of components 130-134 in file 120 includes presenting an option to view additional components 131-133 in file 120 associated with each of the one or more identified components 130 and 134. Application service 101 may further present summary 150 to user 109 by displaying an icon, a toolbar indicator, a typographical variation (e.g., highlighting, shading, bolding, underlining, size enlargement or reduction), an animation, or any other technique to indicate significant portions of components 130 and 134 in file 120. Summary 150 also be displayed in the form of a summary card or an activity log associated with file 120. The summary card or activity log may additionally display an explanation or a preview of the action taken to components 130 and 134 by users of user interfaces 111-113. In some implementations, summary 150 may further display only a portion of components 130 and 134 based on user actions taken on the portion of the component. For example, instead of displaying an entire presentation slide, application service 101 may display only a portion of the presentation slide in summary 150.

FIG. 3 illustrates data table 300 in more detail where exemplary actions are tracked for each component in a file, as well as exemplary user identities and user types for each column. The file type in column 341 of table 300 is at least somewhat representative of a particular presentation shared amongst users in a company. With respect to the components in column 342, each component indicates a different slide in the slide deck for the presentation, although other component types are possible and may be considered within the scope of the present disclosure.

The users in column 344 are the users recorded as performing the action indicated in column 343 on the components of column 342. The actions of column 343 may be any user initiated command performed on the component, such as a view of a duration of time on the component, a highlight of the component, a screenshot of the component, etc. The user types of column 345 represent the user group of the user taking the action of column 343 and may be used to determine whether the action should be included in a particular summary. It should be noted that other exemplary columns may be included in data table which are tracked along with the actions taken by the users on the components. These other columns may include a location, a subject matter, a time frame, a format type, etc.

As shown to the right of table 300, a different summary may be generated for each department group and for the entire company. For example, when 97% of all users view slide 1, that slide will likely be included in the summary for the entire company. Likewise, if the CEO added an addition to slide 22, that slide will likely be significant to all employees in the company. On the other hand, if 70% of users in the Research and Development (R&D) department viewed slide 12, but only a minority of users overall in the company viewed slide 12. Therefore, slide 12 will likely only be included in in the summary for the R&D department. Additionally, if the manager in the marketing department takes a screenshot of slide 23, the marketing department may include slide 23 in the marketing department summary.

It should also be noted that actions taken by other employees outside of the specified department may be "active" for the specified department summary. For example, if the controller in the accounting department shares a screen with other employees in the marketing department, that slide (i.e., slide 24) may also be determined to be significant to the marketing department. On the other hand, slides that did not have any actions taken (i.e., were merely viewed for a brief period of time), the slides may not be included on any type of summary, such as slides 2-9 and 13-20. Furthermore, slides which had an action taken to it but did not account for a majority of users (either in the company or in a department), or taken by a user of interest (such as a manager or executive), would not be added to any summary, such as slide 21 which was merely edited by one user.

Figure 4:
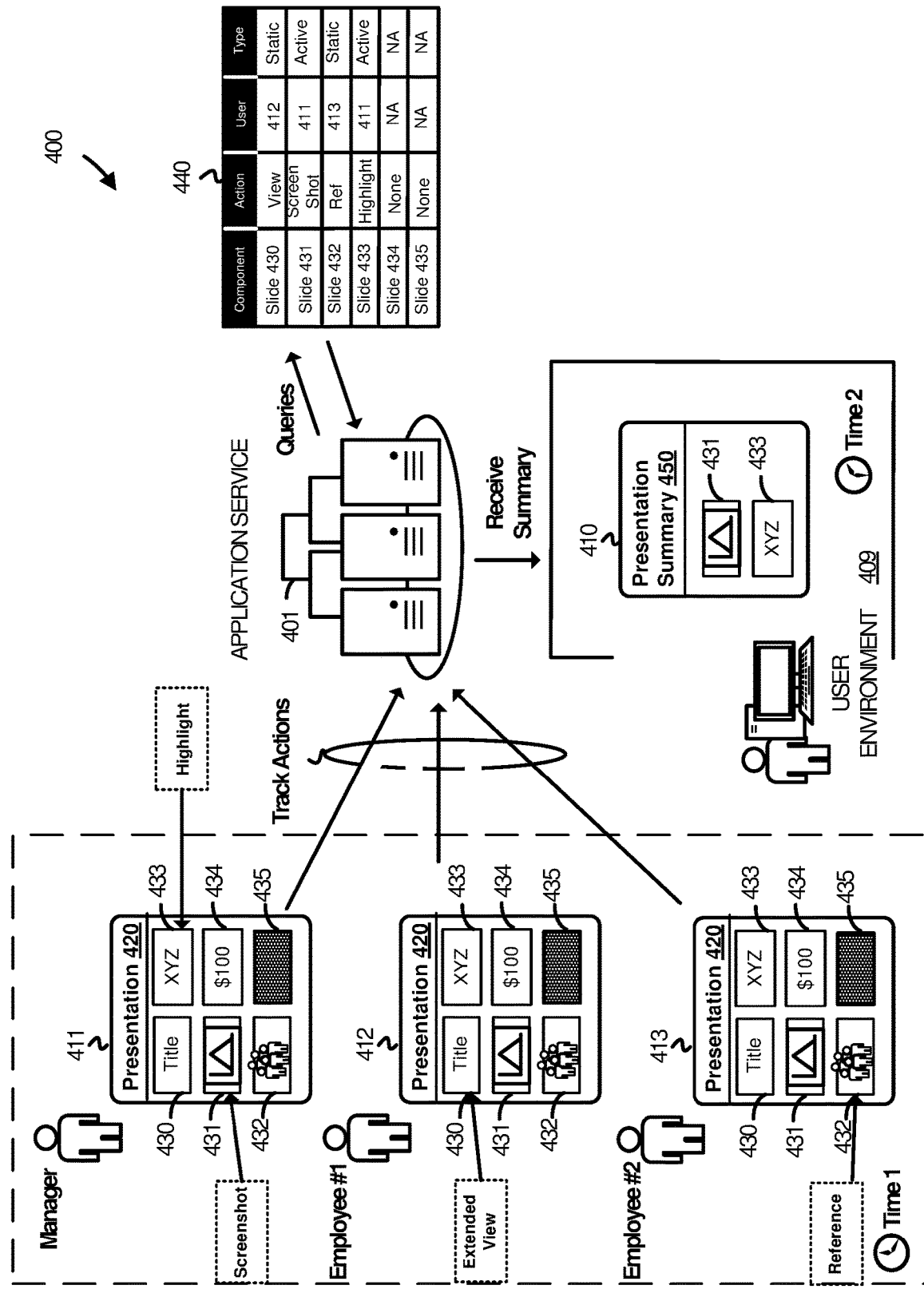
FIG. 4 illustrates an operational architecture in an implementation of an enhanced application to provide users with a summary of components in a file.

FIG. 4 illustrates an exemplary operational architecture for providing a summary of slides in a presentation that may be used in one or more scenarios of the present technology. FIG. 4 illustrates an operational scenario 400 that relates to what occurs when an action is taken on a slide by a person of interest, such as a manager. Operational scenario 400 includes application service 401, user interface 410 in user environment 409, and other users using user interfaces 411-413. User interfaces 411-413 display presentation 420 to a manager via user interface 411 and two employees via user interfaces 412-413. User 409 views presentation summary 450 in user interface 410. Operational scenario 400 also includes record 440 to track and maintain actions taken on slides 430-435 in presentation 420 by users of user interfaces 411-413. In this example, record 440 is maintained in a cloud-based environment.

In a first operation, at Time 1, each of the users of user interfaces 411-413 view presentation 420. The users also perform a variety of actions on slides 430-435. For example, the manager takes a screenshot of slide 431 and highlights slide 433. Furthermore, employee #1 views slide 430 for an extended period of time and employee #2 references content from slide 432. Application service 401 tracks each of these actions and maintains record 440 indicating slides 430-435, the action or actions taken to each of slides 430-435, and the user or users who took the action.

Furthermore, each action per user taken on the slides indicates an allocation type. The allocation type identifies which user actions should be allocated as significant. For example, the actions taken by the manager on slide 431 and 433 are allocated as active indicating that the actions taken by the manager should be used to determine that the slide is significant. On the other hand, the actions taken by employee #1 and employee #2 are allocated as static and therefore, are not determined to be used in the generation of the summary.

In a next operation, at Time 2, user 409 requests a presentation summary 450. In response to the request, application service 401 evaluates record 440 to determine that slides 431 and 433 are significant. On the other hand, slides 430, 432, and 434-435 are not determined to be significant and not included in presentation summary 450. After presentation summary 450 has been generated, application service 401 displays presentation summary 450 to user 409 in user interface 410.

Figure 5:
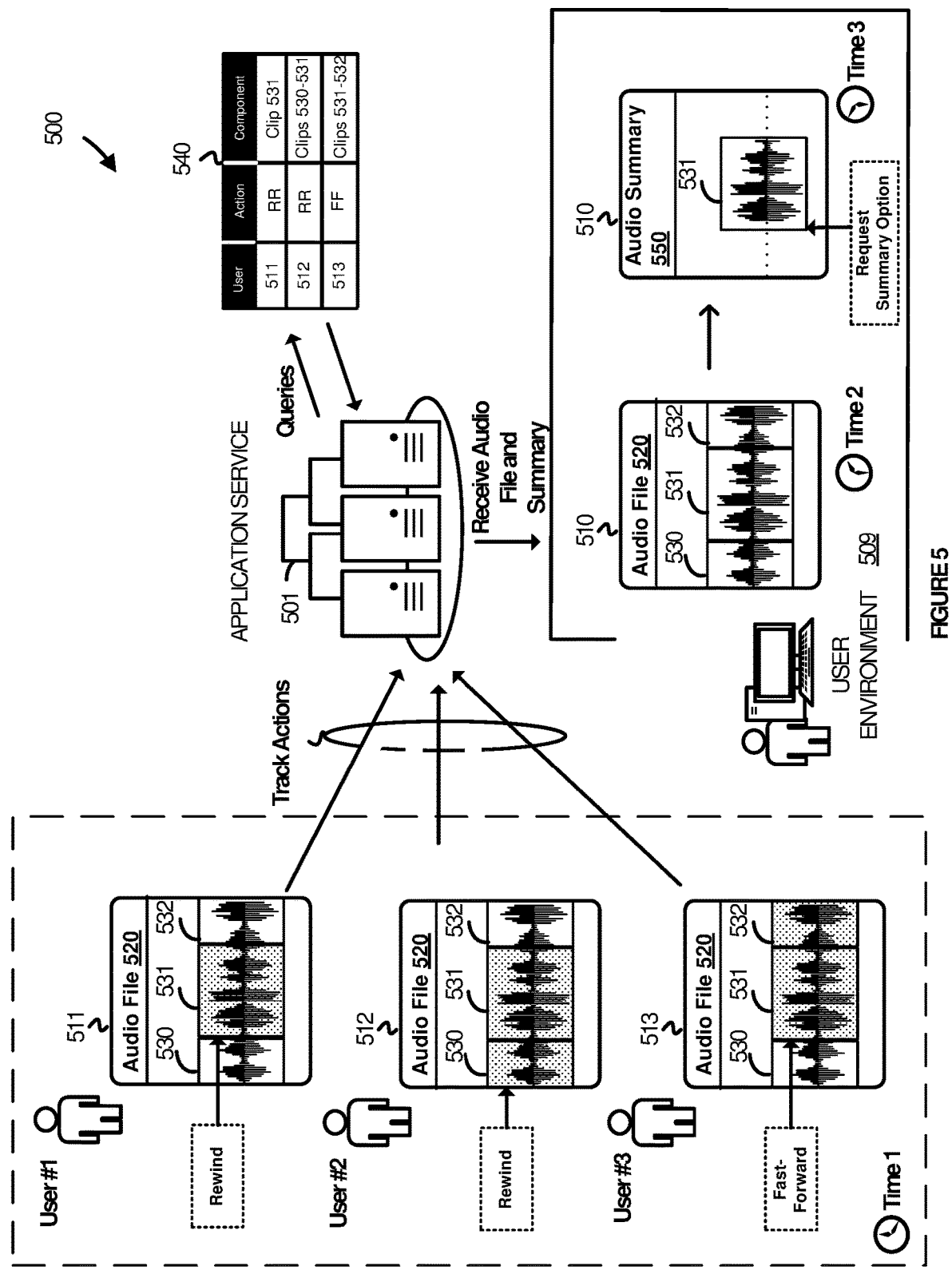
FIG. 5 illustrates an alternative operational architecture in an implementation of an enhanced application to provide users with a summary of components in a file.

FIG. 5 illustrates an alternative operational architecture for providing a summary of audio clips in an audio file that may be used in one or more scenarios of the present technology. FIG. 5 illustrates an operational scenario 500 that relates to what occurs when an action is taken on one or more audio clips in an audio file. Operational scenario 500 includes application service 501, user interface 510 in user environment 509, and other users using user interfaces 511-513. User interfaces 511-513 present audio file 520 via user interfaces 511-513. Application service 501 presents audio file 520 and audio summary 550 in user interface 510. Operational scenario 500 also includes record 540 to track and maintain actions taken on audio clips 530-532 in audio file 520 by users of user interfaces 511-513. In this example, record 540 is maintained in a cloud-based environment.

In a first operation, at Time 1, each of the users of user interfaces 511-513 view presentation 520. The users also perform a variety of actions on audio clips 530-532. For example, the user #1 rewinds and replays clip 531. Furthermore, user #2 rewinds and replays audio clips 530-531 and user #3 fast-forwards over audio clip 530 and plays audio clips 531-532. Application service 501 tracks each of these actions and maintains record 540 indicating the users of user interfaces 511-513 and the action taken by each of user interfaces 511-513 to audio clips 530-532.

In a next operation, at Time 2, user 509 requests to open audio file 520 and audio summary 550. In response to the request, application service 501 evaluates record 540 to determine that audio clip 531 has either be rewound and replayed or fast-forwarded to and played by a majority of the users. Therefore, audio clip 531 is determined to be a significant audio clip of audio file 520. After audio summary 550 has been generated, application service 501 transfers both audio file 520 and audio summary 550 to user 509. At this point user 509 opens audio file 520. In a final operation, at Time 3, user 509 requests to audio summary 550 and user interface 510 presents audio clip 531 in audio summary 550.

Figure 6:
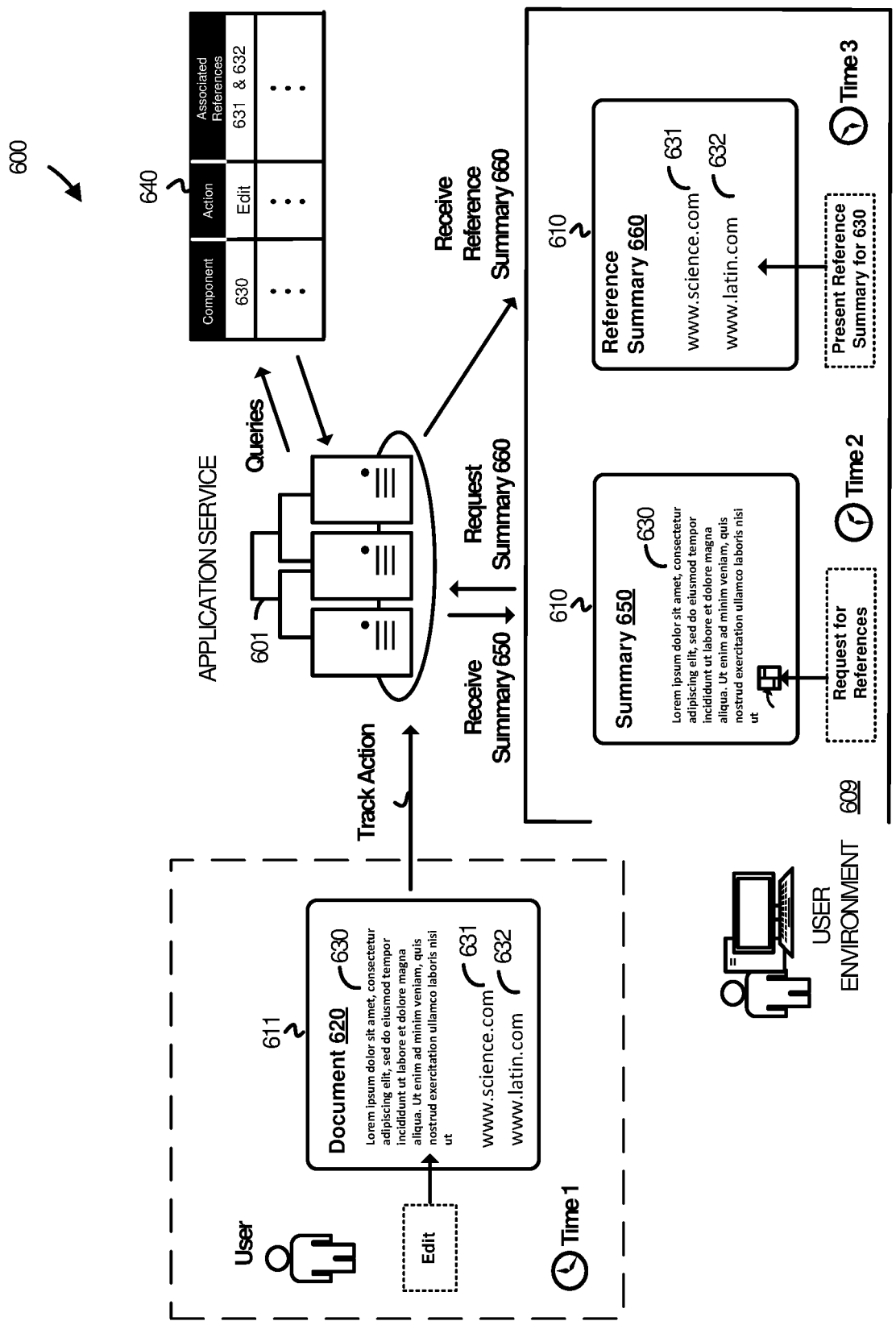
FIG. 6 illustrates an alternative operational architecture in an implementation of an enhanced application to provide users with a summary of components in a file.

FIG. 6 illustrates an alternative operational architecture for providing a summary of related component (i.e. references) to an identified component in a text document that may be used in one or more scenarios of the present technology. FIG. 6 illustrates an operational scenario 600 that relates to what occurs when an action is taken on one or more portions of text in a document and a user requests to view a summary of references of the identified portion of text. Operational scenario 600 includes application service 601, user interface 610 in user environment 609, and another user using user interface 611. User interface 611 presents document 620 via user interface 611. User interface 610 presents summary 650 and summary of references to user 609. Operational scenario 600 also includes record 640 to track and maintain actions taken on component 630 and associated components 631-632.

In a first operation, at Time 1, the user of user interface 611 views document 620. The user of user interface 611 also perform an edit on portion of text 630. Application service 601 tracks this action and maintains record 640 indicating the user of user interface 611, the action taken to portion of text 630, and references 631-632 which are associated with portion of text 630. In a next operation, at Time 2, user 609 requests to view summary 650 of document 620. In response to the request, application service 601 evaluates record 640 to determine that portion of text 630 is determined to be an important section of document 630 since the text has been edited by another user. After summary 650 has been generated, application service 601 transfers summary 650 to user 609. At this point user 609 views summary 660 including portion of text 630 and requests to view associated references to portion of text 630. In a final operation, at Time 3, user 609 receives reference summary 660 which is displayed in user interface 610.

FIG. 7 illustrates computing system 701, which is representative of any system or visual representation of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes process 706, which is representative of the processes discussed with respect to the preceding FIGS. 1-6, including summarizing process 200. When executed by processing system 702 to enhance an application, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, graphical processing unites, application specific processors, and logic devices, as well as any other type of processing device, combination, or variation.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. Software 705 may include program instructions for implementing summarizing process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system to enhance a service for notifying a user of another user's actions on a component of a collaborative document. Indeed, encoding software 705 on storage system 703 may transform the physical structure of storage system 703. The specific transformation of the physical structure may depend on various factors in different implementations of this description. Such factors may include, but are not limited to, the technology used to implement the storage media of storage system 703 and whether the computer-storage media are characterized as primary or secondary storage, as well as other factors.

If the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. User interface system 709 may also include associated user interface software executable by processing system 702 in support of the various user input and output devices discussed above.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

EXAMPLE 1

A computer apparatus comprising: one or more computer readable storage media; one or more processors operatively coupled with the one or more computer readable storage media; and a media application comprising program instructions stored on the one or more computer readable storage media that, when read and executed by the one or more processors, direct the one or more processors to at least: maintain a record of actions taken by users on a plurality of components in a file; evaluate the record to identify one or more components of the plurality of components based on the actions taken by the users on the plurality of components in the file; and present a summary of the plurality of components in the file in a user interface to the application comprising the one or more identified components of the plurality of components.

EXAMPLE 2

The computer apparatus of Example 1 wherein the actions taken by the users on the plurality of components in the file comprise at least one of a screen view for a timed duration, a hover, a tap, a touch, a click, or a screenshot of the plurality of components in the file.

EXAMPLE 3

The computer apparatus of Examples 1-2 wherein the actions taken by the users on the plurality of components in the file comprise at least one of an edit, a copy, a typographical variation, a rewind, or a fast-forward of the plurality of components in the file.

EXAMPLE 4

The computer apparatus of Examples 1-3 wherein: the record of actions taken by the users further comprises at least one of a user identity, a user group, a location, or a subject matter associated with each of the actions; and the program instructions further direct the one or more processors to evaluate the record to identify the one or more components based on the at least one of the user identity, the user group, the location, or the subject matter associated with each the actions.

EXAMPLE 5

The computer apparatus of Examples 1-4 wherein to evaluate the record to identify the one or more components the program instructions direct the one or more processors to evaluate the record to identify the one or more components based on a weighted average of the at least one of the user identity, the user group, the location, or the subject matter associated with each the actions.

EXAMPLE 6

The computer apparatus of Examples 1-5 wherein: the record further comprises actions taken by users on portions of the plurality of components in the file; and the summary further comprises the one or more identified portions of the plurality of components in the file.

EXAMPLE 7

The computer apparatus of Examples 1-6 wherein to present the summary of the plurality of components in the file the program instructions further direct the one or more processors to present an option to view additional components in the file associated with each of the one or more identified components in the file.

EXAMPLE 8

The computer apparatus of Examples 1-7 wherein the components in the file comprise at least a presentation slide, a portion of text, a spreadsheet tab, a data entity card, a photo, a table, a reference, a graph, an audio clip, or a video clip.

EXAMPLE 9

The computer apparatus of Examples 1-8 wherein the file comprises at least a deck of presentation slides, a text document, a spreadsheet book, an audio file, or a video file.

EXAMPLE 10

A method comprising: maintaining a record of actions taken by users on a plurality of components in a file; evaluating the record to identify one or more components of the plurality of components based on the actions taken by the users on the plurality of components in the file; and presenting a summary of the plurality of components in the file in a user interface to an application comprising the one or more identified components of the plurality of components.

EXAMPLE 11

The method of Example 10 wherein the actions taken by the users on the plurality of components in the file comprise at least one of a screen view for a timed duration, a hover, a tap, a touch, a click, or a screenshot of the plurality of components in the file.

EXAMPLE 12

The method of Examples 10-11 wherein the actions taken by the users on the plurality of components in the file comprise at least one of an edit, a copy, a typographical variation, a rewind, or a fast-forward of the plurality of components in the file.

EXAMPLE 13

The method of Examples 10-12 wherein: the record of actions taken by the users further comprises at least one of a user identity, a user group, a location, or a subject matter associated with each of the actions; and evaluating the record to identify the one or more components comprises evaluating the record to identify the one or more components based on the at least one of the user identity, the user group, the location, or the subject matter associated with each the actions.

EXAMPLE 14

The method of Examples 10-13 wherein evaluating the record to identify the one or more components comprises evaluating the record to identify the one or more components based on a weighted average of the at least one of the user identity, the user group, the location, or the subject matter associated with each the actions.

EXAMPLE 15

The method of Examples 10-14 wherein: the record further comprises actions taken by users on portions of the plurality of components in the file; and the summary further comprises the one or more identified portions of the plurality of components in the file.

EXAMPLE 16

The method of Examples 10-15 wherein presenting the summary of the plurality of components in the file further comprises presenting an option to view additional components in the file associated with each of the one or more identified components in the file.

EXAMPLE 17

The method of Examples 10-16 wherein the components in the file comprise at least a presentation slide, a portion of text, a spreadsheet tab, a data entity card, a photo, a table, a graph, an audio clip, or a video clip.

EXAMPLE 18

The method of claim 10-17 wherein the file comprises at least a deck of presentation slides, a text document, a spreadsheet book, an audio file, or a video file.

EXAMPLE 19

One or more computer readable storage media having program instructions stored thereon, wherein the program instructions, when executed by a processing system, direct the processing system to at least: maintain a record of actions taken by users on portions of a plurality of components in a file; evaluate the record to identify one or more portions of the plurality of components based on the actions taken by the users on the portions of the plurality of components in the file; and present a summary of the one or more identified portions of the plurality of components in a user interface to the application.

EXAMPLE 20

The one or more computer readable storage media of Example 19 wherein: the record of actions taken by the users further comprises at least one of a user identity, a user group, a location, or a subject matter associated with each of the actions; and the program instructions further direct the one or more processors to evaluate the record to identify the one or more portions of components based on the at least one of the user identity, the user group, the location, or the subject matter associated with each the actions.

What is claimed is:

1. A server computer comprising:
one or more computer readable storage media;
one or more processors operatively coupled with the one or more computer readable storage media; and
program instructions stored on the one or more computer readable storage media that, when read and executed by the one or more processors, direct the server computer to at least:
receive user input from multiple users engaged with a shared document via multiple computing devices remote from the server computer, wherein the user input comprises commands for performing actions with respect to components of the shared document;
track the actions by the multiple users with respect to the components in the shared document;
for each action of the actions, record information about the action in a database, wherein the information comprises an indication of a component associated with the action, an identity of a corresponding user that performed the action, a group to which the corresponding user belongs, a status of the action, and a status of the component;
receive a request for a summary of the shared document from a productivity application on a computing device associated with one user of the multiple users;
in response to the request, query the information in the database to identify at least one component of the components to present in the summary of the shared document based at least on a weighted average evaluated for each of the actions; and
send the summary to the productivity application on the computing device, wherein the summary comprises a card that displays at least the one component and an indication of one or more of the actions associated with the one component.

2. The server computer of claim 1 wherein the actions comprise at least one of a screen view for a timed duration, a hover, a tap, a touch, a click, or a screenshot of the plurality of components in the shared document.

3. The server computer of claim 1 wherein the actions comprise at least one of an edit, a copy, a typographical variation, a rewind, or a fast-forward of the plurality of components in the shared document.

4. The server computer of claim 1 wherein:
the record of the actions further comprises at least one of a user identity, a user group, a location, or a subject matter associated with each of the actions; and
to identify at least the one component, the program instructions further direct the server computer to evaluate the weighted average for each of the actions based on at least one of the user identity, the user group, the location, and the subject matter associated with each of the actions.

5. The server computer of claim 4 wherein to identify at least the one component, the program instructions further direct the server computer to select at least the one component based on the weighted average evaluated for each of the actions.

6. The server computer of claim 1 wherein the summary includes an option to view an additional component in the shared document associated with the at least one component.

7. The server computer of claim 1 wherein the at least one component comprises at least a presentation slide, a portion of text, a spreadsheet tab, a data entity card, a photo, a table, a reference, a graph, an audio clip, or a video clip.

8. The server computer of claim 1 wherein the shared document comprises at least a deck of presentation slides, a text document, a spreadsheet book, an audio file, or a video file.

9. A computer-implemented method comprising:
a server computer receiving user input from multiple users engaged with a shared document via multiple computing devices remote from the server computer, wherein the user input comprises commands for performing actions with respect to components of the shared document;
the server computer, for each action of the actions, recording information about the action in a database, wherein the information comprises an indication of a component associated with the action, an identity of a corresponding user that performed the action, a group to which the corresponding user belongs, a status of the action, and a status of the component;
the server computer, receiving a request for a summary of the shared document from a productivity application on a computing device associated with one user of the multiple users;
the server computer, in response to the request, querying the information in the database to identifying at least one component of the components to present in the summary of the shared document based at least on a weighted average evaluated for each of the actions; and
the server computer sending the summary to the productivity application on the computing device, wherein the summary comprises a card that displays at least the one component and an indication of one or more of the actions associated with the one component.

10. The method of claim 9 wherein the actions comprise at least one of a screen view for a timed duration, a hover, a tap, a touch, a click, or a screenshot of the plurality of components in the shared document.

11. The method of claim 9 wherein the actions comprise at least one of an edit, a copy, a typographical variation, a rewind, or a fast-forward of the plurality of components in the shared document.

12. The method of claim 9 wherein:
the record of the actions further comprises at least one of a user identity, a user group, a location, or a subject matter associated with each of the actions; and
identifying at least the one component comprises evaluating the weighted average for each of the actions based on at least one of the user identity, the user group, the location, or the subject matter associated with each the actions.

13. The method of claim 12 wherein identifying at least the one component comprises selecting at least the one component based on the weighted average evaluated for each of each the actions.

14. The method of claim 9 wherein the summary includes an option to view an additional component in the shared document associated with the at least one component.

15. The method of claim 9 wherein the at least one component comprises at least a presentation slide, a portion of text, a spreadsheet tab, a data entity card, a photo, a table, a graph, an audio clip, or a video clip.

16. The method of claim 9 wherein the shared document comprises at least a deck of presentation slides, a text document, a spreadsheet book, an audio file, or a video file.

17. One or more computer readable storage media having program instructions stored thereon, wherein the program instructions, when executed by a processing system in a server computer, direct the server computer to at least:

receive user input from multiple users engaged with a shared document via multiple computing devices remote from the server computer, wherein the user input comprises commands for performing actions with respect to components of the shared document;

for each action of the actions, record information about the action in a database, wherein the information comprises an indication of a component associated with the action, an identity of a corresponding user that performed the action, a group to which the corresponding user belongs, a status of the action, and a status of the component;

receive a request for a summary of the shared document from a productivity application on a computing device associated with one user of the multiple users;

in response to the request, query the information in the database to identify at least one component of the components to present in the summary of the shared document based at least on a weighted average evaluated for each of the actions; and send the summary to the productivity application on the computing device, wherein the summary comprises a card that displays at least the one component and an indication of one or more of the actions associated with the one component.

18. The one or more computer readable storage media of claim 17 wherein:

the record of the actions further comprises at least one of a user identity, a user group, a location, or a subject matter associated with each of the actions.

* * * * *